F. J. SPRAGUE
RECORDER.
APPLICATION FILED FEB. 26, 1916.

1,322,148.

Patented Nov. 18, 1919.
2 SHEETS—SHEET 1.

WITNESSES:
INVENTOR,
ATTORNEYS.

F. J. SPRAGUE.
RECORDER.
APPLICATION FILED FEB. 26, 1916.
1,322,148.
Patented Nov. 18, 1919.
2 SHEETS—SHEET 2.
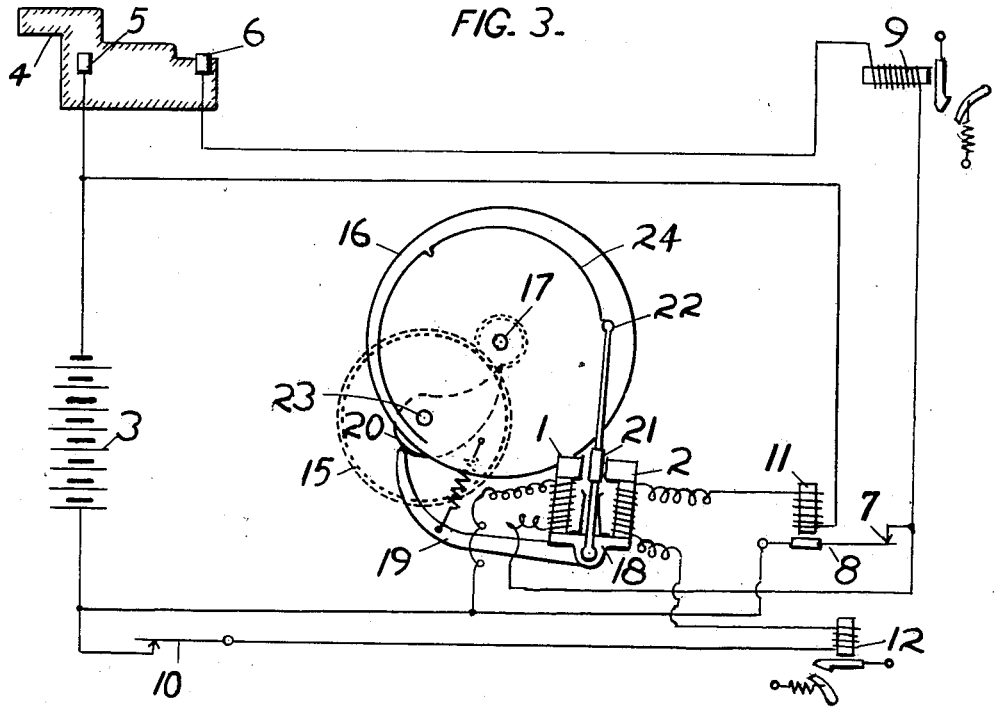
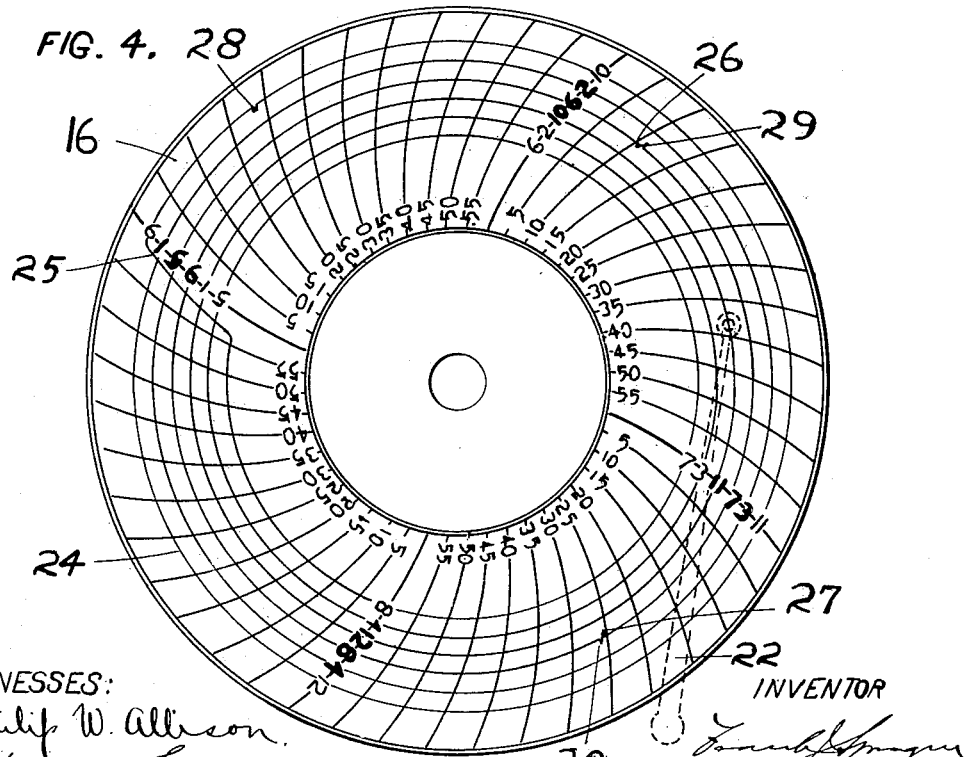
WITNESSES:
INVENTOR
BY
ATTORNEYS

UNITED STATES PATENT OFFICE.

FRANK J. SPRAGUE, OF SHARON, CONNECTICUT, ASSIGNOR TO SPRAGUE SAFETY CONTROL AND SIGNAL CORPORATION, A CORPORATION OF VIRGINIA.

RECORDER.

1,322,148.     Specification of Letters Patent.     Patented Nov. 18, 1919.

Original application filed December 31, 1914, Serial No. 879,939. Divided and this application filed February 26, 1916. Serial No. 80,715.

*To all whom it may concern:*

Be it known that I, FRANK J. SPRAGUE, a citizen of the United States, residing at Sharon, in the county of Litchfield and State of Connecticut, have invented certain new and useful Improvements in Recorders, of which the following is a specification.

This application is filed in response to a requirement of the Patent Office as to division of my prior application filed December 31, 1914, Serial No. 879,939 for method of and apparatus for control of train movements, and the subject-matter hereof forms a part of the apparatus disclosed in the aforesaid prior application whereby the clock-time, character and sequence of the automatic brake pipe reductions therein set forth are recorded. In this application such subject-matter is disclosed and claimed without reference to the question of train control in that the invention embodied therein is capable of other and varied uses, its object being to provide a device whereby different recording impulses produce different recording indications thereof, in which means are provided whereby the recording impulse for one condition is superior to that for another condition, the apparatus being such that the impulses under one condition assume control of the apparatus so that no record is made of the simultaneous presence of the other of the recording impulses but such presence does not interfere with the making of the record of the impulse sought to be recorded. In the apparatus herein shown a nullifying magnet is illustrated as a means for producing this result, but it is to be understood that the invention is in no way limited thereto. The recording is illustrated as being brought about by the action of relays energized either alternatively or consecutively but not simultaneously, which energization results in a relative movement between a record part and a recording part with the resultant indications on the record part of the conditions sought to be recorded. Means are illustrated whereby the clock-time of the indications forms a part of the record but this is a refinement of the invention and it is to be understood that the broad invention is not to be limited thereby or thereto.

In the accompanying drawings which form a part of this application—

Fig. 3 is a diagrammatic view illustrating the action of the recorder in making a record under the influence of another recording impulse and showing the control of the apparatus by the second impulse over the first; and Fig. 4 is a representation of a record card such as made by the mechanism shown in the foregoing figures.

Figure 1:
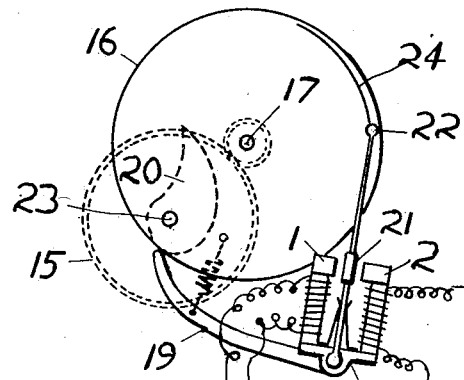
Figure 1 is a diagrammatic view illustrating the normal or at-rest position of the recorder.

In the construction illustrated, two recording relays, 1 and 2, are made use of, which for convenience of description may be called a first recording relay and a second recording relay respectively. The first recording relay is in circuit with a battery 3 through a switch of any desired construction, but illustrated as composed of a commutator shell 4 and commutator brushes 5 and 6, intended to be operated in any desired manner to close the circuit. In shunt to the first recording relay is a contact 7 and an armature 8. This shunt is normally open and is closed in a manner later to be described. In the circuit of the first recording relay may be included relays, the record of the operation of which it is sought to make. One of such operating or other relays 9 is illustrated as being in series in this circuit. Its position in relation to the shunt 7, 8 however, is obviously optional so far as this invention is concerned.

The second recording relay 2 is in circuit to the battery 3 through a switch 10 which may be operated in any desired manner and may be of any desired construction and has in series therewith the coil of a nullifying relay 11 which when energized operates the armature 8. One or more operating or other relays, the operation of which it is desired to record, may be included in this circuit, one of which is illustrated as relay 12.

The recording relays 1 and 2 control the movements of a recording pen over a movable recording card, the driving apparatus for which may be of any character, which causes the rotation of the card at a uniform and desired rate of speed. In the illustrative figures I have shown a spring driven clockwork 15. Any sort of a recording card may be adopted which is suitable, but I have illustrated one in the form of a circular disk 16, which is mounted on a suitably positioned shaft 17 driven by the clockwork. The arrangement may be such that any speed of the card desired may be achieved, the speed of rotation illustrated being six times in 24 hours.

The first recording relay 1 and the second recording relay 2 are mounted on a pivoted supporting yoke 18 having a spring-retracted arm 19 whose free end rests against a cam 20 geared in a convenient ratio to the time shaft of the clockwork.

The relay cores have a common spring-centered centrally positioned armature 21, located between the inwardly projecting portions of their upper extremities. This arm carries a pen 22 maintained in contact against the record card 16. The cam 20 is properly contoured as indicated in Figs. 1, 2, and 3, and is adjustably mounted on a shaft 23 driven by the clockwork 15, the rotation of which bears a fixed relation to the rotation of the recording card; one revolution of the cam to six of the card has been found to give a convenient ratio to produce a long indicating line at the speed of rotation of the card herein illustrated.

The recording card is illustrated as rotating counter-clockwise and the cam clockwise.

Figure 2:
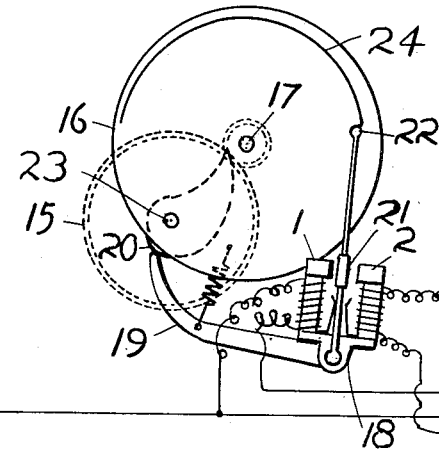
Fig. 2 is a diagrammatic view illustrating the operation of the recorder in making a record under the influence of one recording impulse.

In considering the operation of the recording device, assume the parts moving from the position shown in Fig. 1. As the cam rotates from that position, the end of the arm 19 is slowly moved downward against the tension of its spring by the cam until the peak of the cam passes the end of the arm, when it slides up the reverse curve of the cam, until it reaches the beginning of the spiral portion of the contour of the cam, when it again starts its downward motion. The motion of the arm tilts the supporting block of the recording relays 1 and 2 so that the relays and their armature, with the recording pen are slowly tilted counter-clockwise; when the peak of the cam passes the end of the arm 19 and the arm starts its downward motion, the supporting block, the relays and the recording pen are given a relatively faster motion in a direction away from the center of the recording card. The effect of the downward motion of the arm 19 on the recording card as the latter rotates is illustrated by the spiral line 24 shown in Fig. 4 and the effect of the upward motion of the arm is shown by the line 25 thereon where the inside line of the spiral crosses the other line and starts the outside line of the spiral.

This spiral line is the tracing of the pen on the record card under normal conditions and is therefore a record of what may be termed the static condition of the recorder. The operation of the recorder to record the action of the interposed operating relays under the special conditions of which a record is sought is as follows:

Assume that the switch 4, 5, and 6 has been closed as is indicated in Fig. 2 and that the switch 10 is open. Current then flows through the relay 9 and the first recording relay 1, which causes a sudden movement of the armature 21, and with it the pen 22, to one side and toward that relay, producing a jog in the spiral line on the recording card toward the center thereof, such as is shown in Fig. 4 at 26, 27 and 28. This jog is therefore a record of the action of the operating relay 9 caused by the closing of the switch 4, 5, and 6.

Assume now that the switch 10 has been closed and the switch 4, 5, and 6 is still closed as is illustrated in Fig. 3. Current now flows through the coil of the nullifying relay magnet 11 which draws its armature upward and closes the shunt to the first recording relay 1 at 7. This cuts off current flow from the first recording relay and permits it to release its armature. At the same time the second recording relay 2 is energized, and attracts the armature. The action of the second recording relay is, therefore, through the intervention of the nullifying relay, superior to the action of the first recording relay and insures the making of a record of the operation of the relay 12. This record is made by a sudden movement of the pen 22 to one side and toward the recording relay 2, and produces a jog similar to that above described in the spiral line on the recording card, but away from the center thereof, such as is shown in Fig. 4 at 29 and 30. This jog is therefore a record of the current impulse causing action of the operating relay magnet 12, which being in circuit with the recording relay 2, is energized simultaneously therewith.

The recording card of Fig. 4 is practically a reproduction of a recording card which has been run 24 hours. It is divided off by forty-eight curved lines an equal distance apart, and extending in a general radial direction from the center of the card. These lines are struck from the center of rotation of the armature arm 21, with a radius equal to the distance between the pen point and its center of rotation. With the speed of rotation above given for the recording card, the lines divide the card into five-minute periods, and every twelfth line divides the cards into hour periods.

The hour periods are numbered by the clock hours of the day, the a. m. hours being in light type and the p. m. hours in heavy type. These numbers are placed upon the hour lines a distance apart equal to that between the coils of the spiral line, and follow one another consecutively on the spiral line up to the place where the spiral line is crossed by the movement of the recording pen from the inner line to the outer line of the spiral where the next consecutive hour numeral is moved to the outer line of the spiral. Thus in Fig. 4, the a. m. hour 8 is the last hour numeral on the inner line of the spiral and the a. m. hour 9 starts as the first hour numeral on the outer line of the spiral. The five-minute lines between the hour lines are marked with the five-minute periods between the hours, 5, 10, 15, etc. In reading the card, therefore, in order to determine the times of the operating relay actions, the spiral line containing the jog indication is followed counter-clockwise to the last hour numeral to determine the hour, and its position on or between the five-minute lines determines the number of minutes after that hour the indication was made. If the jog is toward the center of the recording card as has been seen above, it is an indication effected by the first recording relay, and if away from the center, by the second recording relay. Thus the jog bearing the reference numeral 26 records the action of the first recording relay and its interconnected operating relays, for example relay 9, and the jog 29 records the action of the second recording relay and its interconnected operating relays, for example relay 12, at 6:11 p. m., the operation of which has followed immediately after the operation of relay 9 as just described; the jog bearing the reference numeral 27 records the action of the first recording relay and its interconnected operating relays immediately followed by the action of the second recording relay and its interconnected relays at 7:26 p. m., as indicated by the jog 30; and the jog bearing the reference numeral 28 is a record of the action of the first recording relay and its interconnected operating relays at 9:19 a. m.

It has been stated that the cam 20 was adjustably mounted on its motor shaft. This is for the purpose of permittting the proper mounting of the card on the shaft 17. A card such as specifically described ought to be changed every 24 hours so as to avoid re-tracing of the spiral, but the cards can be changed as often as the service requires. In changing cards the fresh one is mounted upon the shaft 17, and is turned and the cam 20 adjusted so that the recording needle starts its tracing on the actual clock time as indicated on the card. The recording card and the cam are next fastened in the then determined position, and the apparatus is in readiness for testing and for recording automatically.

Obviously, the clockwork 15 runs continuously and is intended to be wound up whenever the recorder is desired to be employed.

The foregoing detailed description has been given for clearness of understanding, and no undue limitation should be deduced therefrom, but the appended claims should be construed as broadly as permissible in view of the prior art.

Having thus described my invention, what I claim and desire to secure by Letters Patent is:

1. The combination with a record part and a recording part, of means actuated by different recording impulses for effecting relative movements between the said parts to cause different recording indications for different conditions, and means for causing a recording impulse for one condition to be superior to a recording impulse for another condition.

2. The combination with a record part and a recording part, of means actuated by different recording impulses for effecting relative movements between the said parts to cause different recording indications for different conditions, one of said recording impulses being operative while another recording impulse is present, and means controlled by one of such recording impulses to nullify another of such recording impulses.

3. The combination with a record part and a recording part, of a first means for effecting a relative movement of the parts to effect a recording indication, a second means operative during energization of the first means for effecting a different relative movement between the parts to effect a different recording indication, and means operative upon the action of the second recording means for nullifying the recording action of the first recording means.

4. The combination with a record part and a recording part, of a first means for effecting a relative movement of the parts to effect a recording indication, a second means for effecting a different relative movement between the parts to effect a different recording indication, and governing circuits for said means, the circuit of the second of such means controlling the circuits of the other.

5. The combination with a record part and a recording part, of means for effecting a relative movement of the parts to effect a recording indication, means for effecting a different relative movement between the parts to effect a different recording indication, governing circuits for said recording means, and a relay operativly connected with one of said circuits and controlling the other circuit.

6. The combination with a record part and a recording part having a feeding movement in respect to each other, of a first means for effecting recording movements of such parts at an angle to the feeding movement to one side from a normal central position, and a second means for effecting recording movements of such parts at an angle to the feeding movement to the other side from a normal central position, the means for effecting the second of such side movements when energized being superior to the other of said means.

7. The combination with a record part and a recording part having a feeding movement in respect to each other, of a first means for effecting recording movements of such parts at an angle to the feeding movement to one side from a normal central position, a second means for effecting recording movements of such parts at an angle to the feeding movement to the other side from a normal central position, and circuits governing the said means, the circuit of the second of said means controlling the circuit of the other of said means.

8. In a recorder the combination with a rotating record part, of a pivoted frame, a stylus pivoted on the frame and having a normal position thereon, means for effecting a continued movement of the frame around its pivotal point to cause a gradual movement of the stylus in one direction across the line of travel of the record part, and for quickly removing the frame and stylus carried thereon in the opposite direction, and means for moving the stylus from normal position on the frame for causing indicating movements of the stylus transverse to the travel of the record part.

In testimony whereof I have signed my name.

FRANK J. SPRAGUE.